(12) United States Patent
Zhang et al.

(10) Patent No.: US 10,637,099 B2
(45) Date of Patent: Apr. 28, 2020

(54) ANNULATED TETRA-SUBSTITUTED HYDROQUINONE ETHER-BASED REDOX SHUTTLE ADDITIVES FOR LITHIUM-ION BATTERIES

(71) Applicant: UCHICAGO ARGONNE, LLC, Chicago, IL (US)

(72) Inventors: Lu Zhang, Lisle, IL (US); Jingjing Zhang, Willowbrook, IL (US); Ilya A. Shkrob, Chicago, IL (US); Zhengcheng Zhang, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 50 days.

(21) Appl. No.: 15/597,381

(22) Filed: May 17, 2017

(65) Prior Publication Data

US 2018/0337428 A1  Nov. 22, 2018

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025
See application file for complete search history.

(56) References Cited

U.S. PATENT DOCUMENTS 8,003,260 B2  8/2011  Exnar et al.
2008/0220335 A1  9/2008  Casteel

FOREIGN PATENT DOCUMENTS

WO  WO-2011149970 A2 * 12/2011 ......... C07C 43/2055

OTHER PUBLICATIONS

Pan, F. et al., Redox Species of Redox Flow Batteries: A Review, Molecules 20, 20499-20517 (2015).
Tormena, C.F. et al., Revisiting the Stability of Endolexo Diels-Alder Adducts Between Cyclopentadiene and 1,4-Benzoquinone, Journal Brazil Chemical Society 21 (1), pp. 112-118 (2010).

(Continued)

*Primary Examiner* — Robert S Carrico
*Assistant Examiner* — Kwang Han
(74) *Attorney, Agent, or Firm* — Olson & Cepuritis, Ltd.

(57) ABSTRACT

An electrolyte for a lithium-ion electrochemical cell comprises a non-aqueous solution of a lithium salt and a redox shuttle compound, wherein the redox shuttle compound comprises —OR groups at carbons 1 and 4 of a benzene ring; a first hydrocarbon ring fused to carbons 2 and 3 of the benzene ring; and a second hydrocarbon ring fused to the carbons 5 and 6 of the benzene ring, wherein either (i) the first and second hydrocarbon rings together with the benzene ring constitute two fused benzobicyclo[2.2.2]octane ring systems sharing a common benzo core group; or (ii) the first and second hydrocarbon rings together with the benzene ring constitute two fused benzobicyclo[2.2.1]heptane ring systems sharing a common benzo core group.

18 Claims, 4 Drawing Sheets

BODMA

BODEA

(56) References Cited

OTHER PUBLICATIONS

Wen, J. et al., A Review on Lithium-Ion Batteries Safety Issues: Existing Problems and Possible Solutions, Materials Express 2, (3), pp. 197-212 (2012).
Yates, P. et al., The 1:1 and 2:1 Adducts of Cyclopentadiene with p-Benzoquinone, Can. J. Chemical 68, pp. 1984-1900 (1990).
Zhang, L. et al., Redox Shuttle Additives for Lithium-Ion Battery, Lithium Ion Batteries—New Developments 7, 173-189 (2012).
Zhang, L. et al., Molecular Engineering Towards Safer Lithium-Ion Batteries: A Highly Stable and Compatible Redox Shuttle for Overcharge Protection, Energy & Environmental Science 5, 8204-8207 (2012).
Zhang, L. et al., Redox Shuttles for Overcharge Protection of Lithium-Ion Batteries, ECS Transactions 45 (29), 57-66 (2013).

\* cited by examiner

US 10,637,099 B2

ANNULATED TETRA-SUBSTITUTED HYDROQUINONE ETHER-BASED REDOX SHUTTLE ADDITIVES FOR LITHIUM-ION BATTERIES

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrolyte additive materials for use in electrochemical cells and batteries. More particularly, this invention relates to redox shuttle electrolyte additive materials for lithium ion batteries.

BACKGROUND

Lithium-ion batteries (LIBs) have been considered as one of the most representative classes of modern secondary batteries since their debut in 1990 due to superior features such as high energy density, high discharge potential, low self-discharge, and no memory effects in comparison to traditional rechargeable cells. The prevalence of lithium-ion batteries in numerous applications from wearable electronics to electric vehicles raises increasing attention to safety issues. One of the major concerns with lithium ion batteries is overcharge, which can result in highly dangerous potential hazards like battery component damage, overheat, burn, and even explosion. Overcharge of lithium-ion batteries is a continuous electricity input to cells when full capacity has been reached. Instead of being stored in the electrode, redundant electric energy resulting from overcharge tends to accumulate on the surface of the electrode and elevate the potential dramatically, leading to exothermic reactions of electrolytes and other battery components that are electrochemically inert in normal the potential range of the charging process. Currently, most practical overcharge protection methods can be categorized into two major types: (1) electronic overvoltage cut-off devices, and (2) redox shuttle additives for chemical overcharge protection. It is noteworthy that the second type has elicited particular attention from researchers due to a number of comparative advantages including lower cost, minimized additional weight and volume, and inherent overcharge suppression.

Generally, the redox shuttle molecule can be reversibly oxidized and reduced at a defined potential slightly higher than the end-of-charge potential of the cathode. This mechanism can protect the cell from overcharge by locking the potential of the cathode at the oxidation potential of the shuttle molecules. On the overcharged cathode surface, the redox shuttle molecule (S) is oxidized to its (radical) cation form (S•+), which, via diffusion through the electrolyte, is reduced back to its original or reduced state on the surface of the anode. The reduced form can then diffuse back to the cathode and oxidize again. The "oxidation-diffusion-reduction-diffusion" cycle can be repeated continuously due to the reversible nature of the redox shuttle to shunt the overcharge current. The redox shuttling mechanism at overcharge can be regarded as a controlled internal short, and the net result of the shuttling is to convert the overcharge electricity power into heat, which avoids the reactions that occur between the electrodes and electrolyte at high voltage. Redox shuttles can also be used for automatic capacity balancing during battery manufacturing and repair. Modern LIB designs are challenging the limits of current redox shuttle materials.

Ideal redox shuttle additives are materials that can be readily dissolved in electrolyte and have appropriate oxidation potential (approximately 0.3-0.5 V higher than that of the cathode) while maintaining high electrochemical stability. Once the potential of the cathode exceeds the potential of redox shuttle additives, initially unreactive shuttle molecules will be electrochemically activated, and start to take over the oxidative electrons. As a result, the potential of the cell remains unchanged in this process. Redox shuttle additives in the oxidative state then diffuse to the anode and get reduced to the initial state, which will transport back to the cathode. Therefore, this sustainable circle of redox shuttle additives prevents potential hazards of overcharge by fixing the cathode potential at their oxidation potential. Although a large variety of materials have been attempted to serve this purpose, it still remains a great challenge to develop shuttle additives featuring high solubility, suitable oxidation potential, and high electrochemical stability in one system. To this day, one of the most promising additives is 2,5-di-tert-butyl-1,4-bis(2-methoxyethoxy)benzene (DBBB), which has an oxidation potential at 3.98 V vs. Li/Li$^+$ and undergoes overcharge abuse for over 3000 hours before a significant drop in performance is observed. One possible reason for the eventual performance drop is believed to be the consumption of redox shuttle additives through reactions between the two unsubstituted positions on the radical cation after oxidation.

There is an ongoing need for new redox shuttle chemistries to ameliorate the overcharge phenomenon in lithium-ion batteries. The redox shuttle additive described herein address this need.

SUMMARY

An electrolyte for a lithium-ion electrochemical cell is described herein. The electrolyte comprises a non-aqueous solution of a lithium salt and a redox shuttle compound. The redox shuttle compound comprises a benzene ring with alkoxy substituents, —OR, at carbons 1 and 4 of the benzene ring, where R is an alkyl group (e.g., a $C_1$ to $C_8$ alkyl, such as octyl, hexyl, sec-butyl, isopropyl, propyl, ethyl, methyl, and the like; preferably $C_1$ to $C_4$ alkyl, such as butyl, propyl, ethyl methyl and the like) or an alkoxy-substituted alkyl group (e.g., a $C_1$-$C_4$ alkoxy-substituted $C_1$ to $C_4$ alkyl group such as, 2-methoxyethyl, 2-ethoxyethyl, 2-methoxypropyl, 3-methoxypropyl, 3-tert-butoxypropyl, and the like). A first hydrocarbon ring is fused in a bridging arrangement to carbons 2 and 3 of the benzene ring, and a second hydrocarbon ring fused in a bridging arrangement to the carbons 5 and 6 of the benzene ring. The first and second hydrocarbon rings both are fused to the benzene ring such that the benzene ring together with each respective hydrocarbon ring constitute two benzobicyclo[2.2.2]octane ring systems or two benzobicyclo[2.2.1]heptane ring systems sharing a common benzo core group.

The bridged hydrocarbon rings of these redox shuttle compounds not only cut off pathways to approach the aromatic core from the benzene plane, but also provide significant steric shielding to prevent attack from either the above or below the plane. This shielding can result in protection from various degradative processes during cycling. In addition, the bicyclic groups have less steric impact on conformation changes of the 1,4-alkoxy groups during oxidation than, e.g., the tert-butyl groups in DBBB, resulting in more stable radical cations and better overcharge performance. Additionally, unsubstituted or alkyl-substituted bicyclo[2.2.1]heptane or bicyclo[2.2.2]octane compounds, contain only H— and sp³ C-atoms, and thus provide similar oxidation potential to that of DBBB. Illustrative non-limiting examples of two representative redox shuttle additives described herein are 9,10-bis(2-methoxyethoxy)-1,2,3,4,5,6,7,8-octahydro-1,4:5,8-dimethanoanthracene (BODMA), and 9,10-bis(2-methoxyethoxy)-1,2,3,4,5,6,7,8-octahydro-1,4:5,8-diethanoanthracene (BODEA), which are illustrated in FIG. 1.

Non-limiting examples of certain embodiments of the electrolytes and materials described herein include:

Embodiment 1 is an electrolyte for a lithium-ion battery comprising a non-aqueous solution of a lithium salt and a redox shuttle compound, wherein the redox shuttle compound comprises: (a) —OR groups at carbons 1 and 4 of a benzene ring; (b) a first hydrocarbon ring fused to carbons 2 and 3 of the benzene ring; and (c) a second hydrocarbon ring fused to the carbons 5 and 6 of the benzene ring; and wherein either (i) the first and second hydrocarbon rings together with the benzene ring constitute two fused benzobicyclo[2.2.2]octane ring systems; or (ii) the first and second hydrocarbon rings together with the benzene ring constitute two fused benzobicyclo[2.2.1]heptane ring systems sharing a common benzo core group.

Embodiment 2 is the electrolyte of Embodiment 1, wherein the first and second hydrocarbon rings each comprise at least one substituent selected from the group consisting of alkyl, alkoxy, hydroxyl, halogen, substituted-alkyl, and substituted-alkoxy; wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

Embodiment 3 is the electrolyte of any one of Embodiments 1 to 2, wherein the first and second hydrocarbon rings each are unsubstituted hydrocarbons.

Embodiment 4 is the electrolyte of any one of Embodiments 1 to 3, wherein the R of each —OR group is selected from the group consisting of $C_1$ to $C_4$ alkyl and $C_1$ to $C_4$ alkoxy-substituted $C_1$ to $C_4$ alkyl.

Embodiment 5 is the electrolyte of any one of Embodiments 1 to 4, wherein the lithium salt comprises at least one salt selected from the group consisting of $LiF_2BC_2O_4$, $LiPF_6$, $LiBF_4$, $LiB(C_2O_4)_2$, $LiClO_4$, lithium bis(fluorosulfonyl)imide (LiFSI), lithium bis(trifluoromethanesulfonyl)imide (LiTFSi), and $LiAsF_6$.

Embodiment 6 is the electrolyte of any one of Embodiments 1 to 5, wherein the solvent comprises one or more solvent selected from a linear dialkyl carbonate (e.g., dimethyl carbonate, diethyl carbonate, ethyl methyl carbonate), a cyclic alkylene carbonate (ethylene carbonate, propylene carbonate), a sulfolane, a sulfone, a fluoro-substituted linear dialkyl carbonate, a fluoro-substituted cyclic alkylene carbonate, a fluoro-substituted sulfolane, and a fluoro-substituted sulfone.

Embodiment 7 is the electrolyte of any one of Embodiments 1, 5, and 6, wherein the redox shuttle comprises a compound of Formula (I):

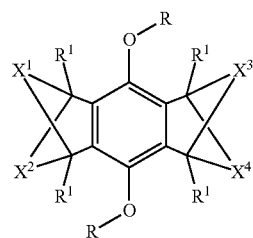

(I)

wherein: each R independently is selected from alkyl and substituted-alkyl; $X^1$ is —C(R²)₂C(R²)₂—; $X^2$ is —C(R²)₂C(R²)₂— or —C(R²)₂—; each of $X^3$ and $X^4$ is —C(R³)₂C(R³)₂— or —C(R³)₂—; and each R¹, R², and R³ independently is selected from H, alkyl, substituted-alkyl, alkoxy, substituted-alkoxy, halogen, and hydroxyl; wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide; with the provisos that: (a) if $X^2$ is —C(R²)₂—, then at least one of $X^3$ and $X^4$ is —C(R³)₂—, and at least one of $X^3$ and $X^4$ is —C(R³)₂C(R³)₂—; and (b) if $X^2$ is —C(R²)₂C(R²)₂—, then both of $X^3$ and $X^4$ are —C(R³)₂C(R³)₂—.

Embodiment 8 is the electrolyte of Embodiment 7, wherein each R is a $C_1$ to $C_4$ alkoxy-substituted $C_1$ to $C_4$ alkyl.

Embodiment 9 is the electrolyte of any one of Embodiments 7 to 8, wherein each R is 2-methoxyethyl.

Embodiment 10 is the electrolyte of any one of Embodiments 7 to 9, wherein each R¹, R², and R³ independently is selected from H, $C_1$ to $C_4$ alkyl, and $C_1$ to $C_4$ alkoxy.

Embodiment 11 is the electrolyte of any one of Embodiments 7 to 10, wherein each R¹, R², and R³ is H.

Embodiment 12 is the electrolyte of any one of Embodiments 1, 5, and 6, wherein the first and second hydrocarbon rings together with the benzene ring constitute two benzobicyclo[2.2.2]octane ring systems, and the redox shuttle comprises a compound of Formula (II):

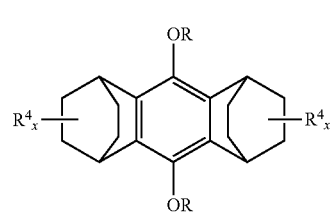

(II)

wherein: the first hydrocarbon ring and the second hydrocarbon ring each optionally comprises one or more substituents $R^4$; x is 0, 1, 2, 3, 4, 5, 6, 7, 8, 9, or 10; each R independently is selected from alkyl and substituted-alkyl; and each $R^4$ independently is selected from alkyl, substituted-alkyl, alkoxy, substituted-alkoxy, halogen, and hydroxyl; wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

Embodiment 13 is the electrolyte of Embodiment 12, wherein x is 0; and each R is a $C_1$ to $C_4$ alkoxy-substituted $C_1$ to $C_4$ alkyl.

Embodiment 14 is the electrolyte of any one of Embodiments 1, 5 or 6, wherein the first and second hydrocarbon rings together with the benzene ring constitute two benzobicyclo[2.2.2]heptane ring systems, and the redox shuttle comprises a compound of Formula (III):

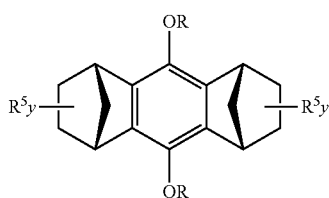

(III)

wherein: the first hydrocarbon ring and the second hydrocarbon ring each optionally comprises one or more substituents $R^5$; y is 0, 1, 2, 3, 4, 5, 6, 7, or 8; each R independently is selected from alkyl and substituted-alkyl; and each $R^5$ independently is selected from alkyl, substituted-alkyl, alkoxy, substituted-alkoxy, halogen, and hydroxyl; wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide Embodiment 15 is the electrolyte of Embodiment 14, wherein y is 0; and each R is a $C_1$ to $C_4$ alkoxy-substituted $C_1$ to $C_4$ alkyl.

Embodiment 16 is the electrolyte of Embodiment 1, wherein the first and second hydrocarbon rings together with the benzene ring constitute two benzobicyclo[2.2.2]heptane ring systems, and the redox shuttle comprises a compound of Formula (IV):

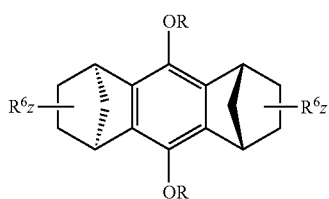

(IV)

wherein the first hydrocarbon ring and the second hydrocarbon ring each optionally comprises one or more substituents $R^5$; z is 0, 1, 2, 3, 4, 5, 6, 7, or 8; each R independently is selected from alkyl and substituted-alkyl; and each $R^6$ independently is selected from alkyl, substituted-alkyl, alkoxy, substituted-alkoxy, halogen, and hydroxyl; wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

Embodiment 17 is the electrolyte of Embodiment 1, wherein the redox shuttle is selected from a compound of Formula (V), a compound of Formula (VI) or a combination thereof:

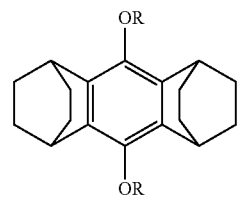

(V)

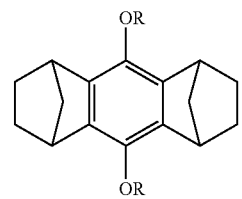

(VI)

wherein each R is selected from $C_1$ to $C_8$ alkyl and $C_1$ to $C_4$ alkoxy-substituted $C_1$ to $C_4$ alkyl.

Embodiment 18 is the electrolyte of Embodiment 1, wherein the redox shuttle is selected from 9,10-bis(2-methoxyethoxy)-1,2,3,4,5,6,7,8-octahydro-1,4:5,8-dimethanoanthracene (BODMA), 9,10-bis(2-methoxyethoxy)-1,2,3,4,5,6,7,8-octahydro-1,4:5,8-diethanoanthracene (BODEA), and a combination thereof.

Embodiment 19 is a lithium-ion electrochemical cell comprising an anode, a cathode, and an a porous membrane therebetween, wherein the electrolyte of any one of Embodiments 1 to 18 contacts the anode, the cathode, and the membrane.

Embodiment 20 is a lithium-ion battery comprising two or more electrochemical cells of Embodiment 19, wherein the cells are connected in series, parallel, or both series and parallel.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF SELECTED EMBODIMENTS

Figure 1:
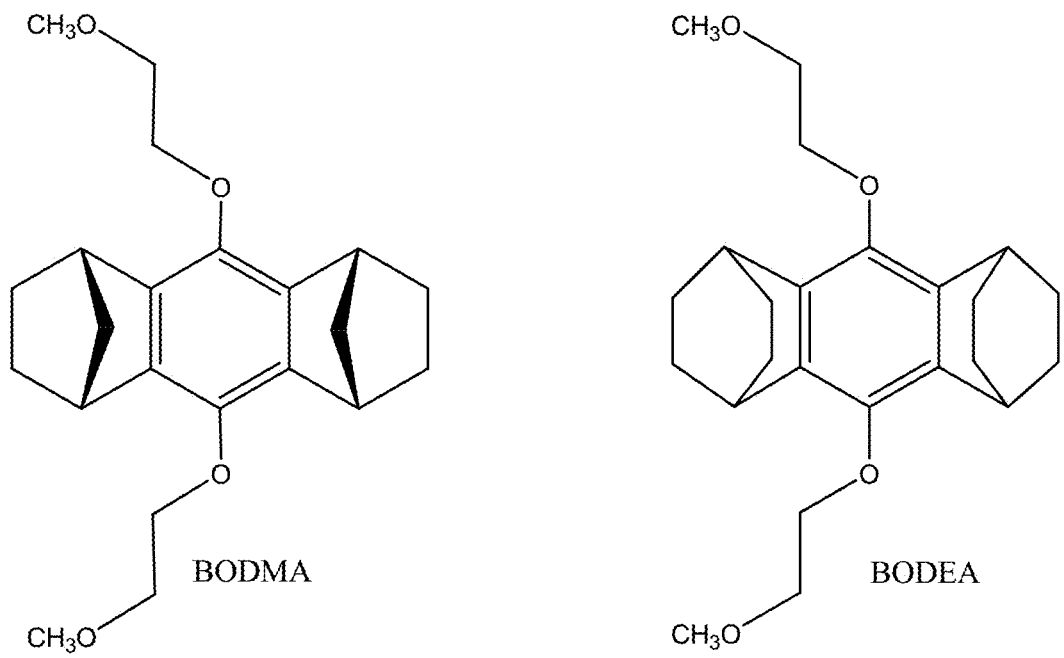
FIG. 1 shows structures of two illustrative fused benzobicyclo-type additives (BODMA and BODEA) described herein.

Described herein are non-aqueous electrolytes for a lithium-ion batteries comprising a lithium salt and a redox shuttle additive in a non-aqueous solvent. The redox shuttle additives are fused benzobicyclo[2.2.2]octane and fused benzobicyclo[2.2.1]heptane compounds comprising alkoxy substituents at carbons 1 and 4 of a benzene ring; with a first bridging hydrocarbon ring is fused in a to carbons 2 and 3 of the benzene ring, and a second bridging hydrocarbon ring fused to the carbons 5 and 6 of the benzene ring. The first and second hydrocarbon rings both are fused to the benzene ring such that the benzene ring together with each respective hydrocarbon ring constitute two benzobicyclo[2.2.2]octane ring systems or two benzobicyclo[2.2.1]heptane ring systems sharing a common benzo core group.

The additive compounds can be synthesized by Diels-Alder reaction of a cyclohexadiene or cyclopentadiene with hydroquinone to form the basic fused bicyclic ring systems, followed by various redox reactions and other functionalization reactions to arrive at the additive compounds, as described in more detail in the examples provided herein, and as illustrated generically in Schemes 1 and 2, below.

Scheme 1:

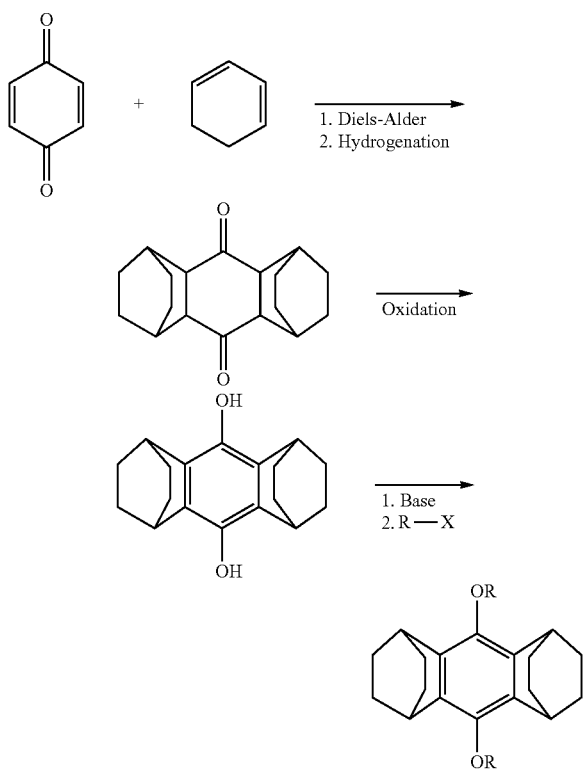

In Scheme 1, 1,4-quinone is reacted with two equivalents of a cyclohexadiene in a Diels-Alder reaction, and the double bonds of the resulting cycloadduct are reduced by hydrogenation (e.g., by hydrogen with Pd/C catalyst in a solvent such as ethanol) to form a hydroquinone adduct. Oxidation of the hydroquinone adduct forms a 9,10-bis(hydroxy)-1,2,3,4,5,6,7,8-octahydro-1,4:5,8-diethanoanthracene. Finally, the phenolic hydroxy groups of the 9,10-bis(hydroxy)-1,2,3,4,5,6,7,8-octahydro-1,4:5,8-diethanoanthracene are alkylated with base and an activated alkyl or substituted-alkyl compound (RX, where R is alky or substituted-alkyl, and X is a leaving group such as Br, I, mesyl, tosyl, and the like). Inclusion of substituents on the cyclohexadiene results in a product with one or more substituents on each bridged-bicyclo ring system.

Scheme 2:

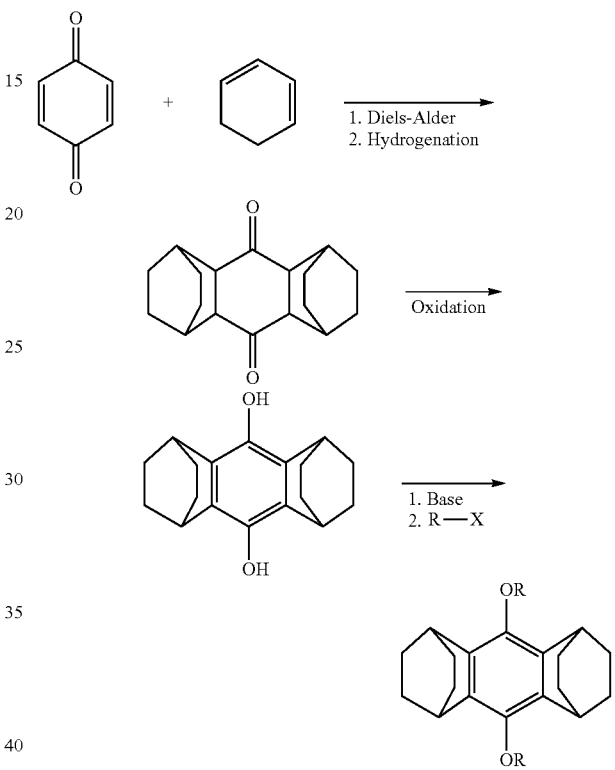

In Scheme 2, 1,4-quinone is reacted with two equivalents of a cyclopentadiene in a Diels-Alder reaction, and the double bonds of the resulting cycloadduct are reduced by hydrogenation (e.g., by hydrogen with Pd/C catalyst in a solvent such as ethanol) to form a hydroquinone adduct. Oxidation of the hydroquinone adduct (e.g., using bromine) forms results in a 9,10-bis(hydroxy)-1,2,3,4,5,6,7,8-octahydro-1,4:5,8-dimethanoanthracene. Finally, the phenolic hydroxy groups of the 9,10-bis(hydroxy)-1,2,3,4,5,6,7,8-octahydro-1,4:5,8-dimethanoanthracene are alkylated with base and an activated alkyl or substituted-alkyl compound (RX, where R is alky or substituted-alkyl, and X is a leaving group such as Br, I, mesyl, tosyl, and the like). Compounds of this form have been reported, e.g., by Yates et al., *Can. J. Chem.* 1990; 68:1894-1900. Inclusion of substituents on the cyclopentadiene results in a product with one or more substituents on each bridged-bicyclo ring system. In some cases the orientation of the methano bridges are on the same side of the plane of the benzene ring, as in Formula (III), whereas in other case orientation of the methano bridges can be on opposite sides of the plane of the benzene ring, as in Formula (IV). Frequently, mixtures of products with the two different methano bridge orientations are formed, which can be used as a mixture, or the individual isomers can be separated by known separation methods, such as chromatography, crystallization, and the like.

In both Scheme 1 and Scheme 2, if the diene in the Diels-Alder reaction (cyclohexadiene or cyclopentadiene, respectively) is a substituted diene, then isomers with different substituent positions and orientations can be produced in some cases, resulting in mixtures of different Diels-Alder adducts, as will be readily understood by those of ordinary skill in the chemical arts. Such mixtures can be separated into their component parts for subsequent reactions in the Schemes or the entire mixture can be carried through all or some of the reactions steps. In the electrolytes described herein, the redox reactant can be a single compound or mixtures of compounds having the characteristics defined in Formulas (I), (II), (III), (IV), (V), and (VI).

Exemplary preferred structures for the additive compounds described herein include Formulas (I), (II), and (III):

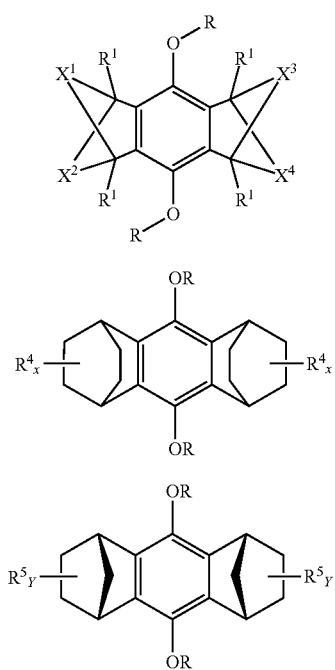

wherein:
each R independently is selected from alkyl and substituted-alkyl;
$X^1$ is —C($R^2$)$_2$C($R^2$)$_2$—;
$X^2$ is —C($R^2$)$_2$C($R^2$)$_2$— or —C($R^2$)$_2$—;
each of $X^3$ and $X^4$ is —C($R^3$)$_2$C($R^3$)$_2$— or —C($R^3$)$_2$—; and
each $R^1$, $R^2$, $R^3$, $R^5$ and $R^3$ independently is selected from H, alkyl, substituted-alkyl, alkoxy, substituted-alkoxy, halogen, and hydroxyl;
x is 0, 1, 2, 3, 4, 5, 6, 7, 8, 9, or 10; and
y is 0, 1, 2, 3, 4, 5, 6, 7, or 8;
wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide;
with the provisos that:
(a) if $X^2$ is —C($R^2$)$_2$—, then at least one of $X^3$ and $X^4$ is —C($R^3$)$_2$—, and at least one of $X^3$ and $X^4$ is —C($R^3$)$_2$C($R^3$)$_2$—; and (b) if $X^2$ is —C($R^2$)$_2$C($R^2$)$_2$—, then both of $X^3$ and $X^4$ are —C($R^3$)$_2$C($R^3$)$_2$—.

Alternatively, a benzobycyclo(2.2.1] heptane redox shuttle additive compound can have the structure of Formula (IV):

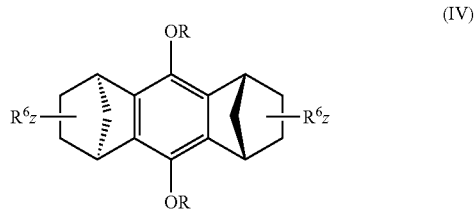

wherein:
z is 0, 1, 2, 3, 4, 5, 6, 7, or 8;
each R independently is selected from alkyl and substituted-alkyl; and
each $R^6$ independently is selected from alkyl, substituted-alkyl, alkoxy, substituted-alkoxy, halogen, and hydroxyl;
wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

The compounds of Formulas (II) and (III) are preferred, especially wherein x and y are 0, and R is a $C_1$ to $C_4$ alkoxy-substituted $C_1$ to $C_4$ alkyl (e.g., 2-methoxyethyl, 2-ethoxyethyl, 3-methoxypropyl, and the like). BODMA (9,10-bis(2-methoxyethoxy)-1,2,3,4,5,6,7,8-octahydro-1,4:5,8-dimethanoanthracene), and BODEA 9,10-bis(2-methoxyethoxy)-1,2,3,4,5,6,7,8-octahydro-1,4:5,8-diethanoanthracene are particularly preferred redox shuttle compounds.

The additive (e.g., one or more compound of Formula (I), (II), (III) or (VI)) can be present in the electrolyte at any concentration, but preferably is present at a concentration in the range of about 0.005M to about 0.4 M. In some embodiments, the additive is present in the electrolyte at a concentration in the range of about 0.01 M to about 0.4 M, or about 0.03 M to about 0.3 M.

The electrolyte can include any lithium salt that is suitable for use as a lithium ion source in electrolytes for lithium-ion batteries, which salts are well known in the secondary battery art. Preferably, the lithium salt is selected from one or more of $LiF_2BC_2O_4$, $LiPF_6$, $LiBF_4$, $LiB(C_2O_4)_2$, $LiClO_4$, lithium bis(fluorosulfonyl)imide (LiFSI), lithium bis(trifluoromethanesulfonyl)imide (LiTFSi), and $LiAsF_6$. The lithium salt can be present in the electrolyte at any concentration suitable for lithium-ion battery applications, which concentrations are well known in the secondary battery art. In some embodiments, the lithium salt is present in the electrolyte at a concentration in the range of about 0.1 M to about 3 M, e.g., about 0.5 M to 2 M, or 1 M to 1.5M.

The electrolyte comprises a non-aqueous solvent, wherein the solvent comprises one or more solvent compound selected from a linear dialkyl carbonate (e.g., dimethyl carbonate (DMC), diethyl carbonate (DEC), ethyl methyl carbonate (EMC)), a cyclic alkylene carbonate (ethylene carbonate (EC), propylene carbonate (PC)), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds. in some embodiments, the solvent comprises a mixture of a cyclic alkylene carbonate and a linear dialkyl carbonate, for example, a mixture of ethylene carbonate and ethyl methyl carbonate (EC/EMC), e.g., in a weight to weight ratio of about 3:7 EC:EMC.

The electrolytes can be incorporated in a lithium ion electrochemical cell comprising a positive electrode (cathode), a negative electrode (anode), and a porous separator between the cathode and anode, with the electrolyte in contact with both the anode and cathode, as is well known in the battery art. A battery can be formed by electrically connecting two or more such electrochemical cells in series, parallel or a combination of series and parallel. The electrolyte can be utilized with any anode or cathode compositions useful in lithium-ion batteries. Electrochemical cell and battery designs and configurations, anode and cathode materials, as well as electrolyte salts, solvents and other battery components, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

The following non-limiting examples illustrate various features of the electrolytes and materials described herein, as well as methods of synthesizing such compounds.

Example 1. Synthesis of Redox Shuttle Additives

A. Synthesis of 9,10-bis(2-methoxyethoxy)-1,2,3,4,5,6,7,8-octahydro-1,4:5,8-dimethanenoanthracene (BODMA)

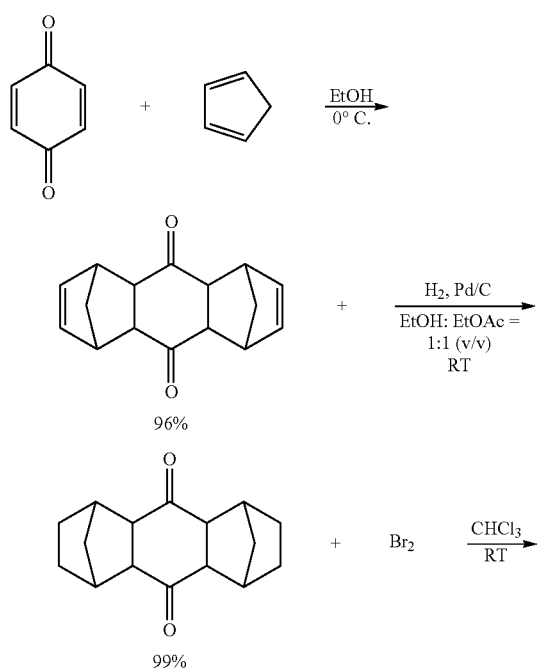

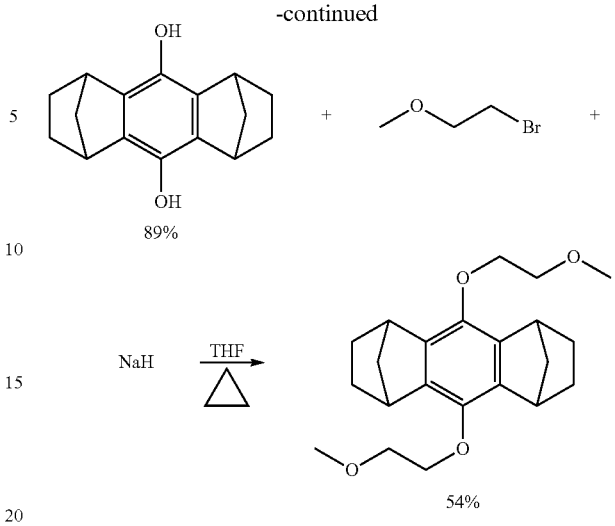

To an ice-cold solution of p-quinone (7.0 g, 65 mmol) in 70 mL of ethanol was added freshly prepared cyclopentadiene (8.6 g, 130 mmol), and the mixture was stirred for about 0.5 hour. The resulting white solid was filtered and washed with cold ethanol (about 20 mL) to yield 1,4,4a,5,8,8a,9a,10a-octahydro-1,4:5,8-dimethanoanthracene-9,10-dione (15.0 g, 96.4%).

Next, a solution of 1,4,4a,5,8,8a,9a,10a-octahydro-1,4:5,8-dimethanoanthracene-9,10-dione (6.0 g, 25 mmol) in 80 mL of ethanol/ethyl acetate (1:1, v/v ETOH/EtOAc) containing 10 wt % Pd/C was hydrogenated under a $H_2$ atmosphere at room temperature. The reaction progress was monitored by GC-MS. Upon the full consumption of the starting material, the Pd/C catalyst was separated by filtration through a short pad of CELITE followed by rinsing with dichloromethane. The filtrate was concentrated in vacuo to afford dodecahydro-1,4:5,8-dimethanoanthracene-9,10-dione (6.0 g, 99%).

Dodecahydro-1,4:5,8-dimethanoanthracene-9,10-dione (3.6 g, 14.6 mmol) was dissolved in 20 mL of dry chloroform at room temperature and a solution of $Br_2$ (2.3 g, 14.6 mmol) in abut 20 mL of chloroform was added dropwise over about 0.5 hour. A white precipitate was observed upon addition of $Br_2$. The resulting suspension was stirred at room temperature for about 2 hours. Most of the HBr produced in the reaction was blown off by bubbling $N_2$ through the reaction mixture. The resultant suspension was cooled in an ice-acetone bath, and the precipitate was filtered in vacuo to provide 1,2,3,4,5,6,7,8-octahydro-1,4:5,8-dimethanoanthracene-9,10-diol (3.1 g, 89%).

Finally, 1,2,3,4,5,6,7,8-octahydro-1,4:5,8-dimethanoanthracene-9,10-diol (1.5 g, 6.19 mmol) was dissolved in dry tetrahydrofuran (about 12 mL). NaH (0.7 g, 1.86 mmol) and 2-bromoethylmethyether (1.8 g, 1.30 mmol) were added, and the reaction mixture was stirred at room temperature overnight. The reaction was quenched by adding about 20 mL of 0.1 M $NaHCO_3$ aqueous solution and extracted with dichloromethane. The organic layer was then separated and dried over $Na_2SO_4$. The crude product was recrystallized from hexane and dichloromethane to provide 9,10-bis(2-methoxyethoxy)-1,2,3,4,5,6,7,8-octahydro-1,4:5,8-dimethanoanthracene (1.2 g, 54%).

$^1$HNMR spectrum of BODMA. $^1$HNMR (300 MHz, $CDCl_3$): δ/ppm 4.14-4.07 (m, 2H), 4.00-3.93 (m, 2H), 3.67-3.62 (m, 4H), 3.50 (s, 4H), 3.42 (s, 6H), 1.82 (d, J=7.2

Hz, 4H), 1.61 (dt, J=8.5, 1.6 Hz, 2H), 1.38 (d, J=8.1 Hz, 2H), 1.14 (m, 4H); $^{13}$CNMR spectrum of BODMA. $^{13}$CNMR (75 MHz, CDCl$_3$): δ/ppm 142.4, 138.0, 72.7, 71.8, 59.2, 49.0, 40.6, 26.9.

B. Synthesis of 9,10-bis(2-methoxyethoxy)-1,2,3,4,5,6,7,8-octahydro-1,4:5,8-diethanoanthracene (BODEA)

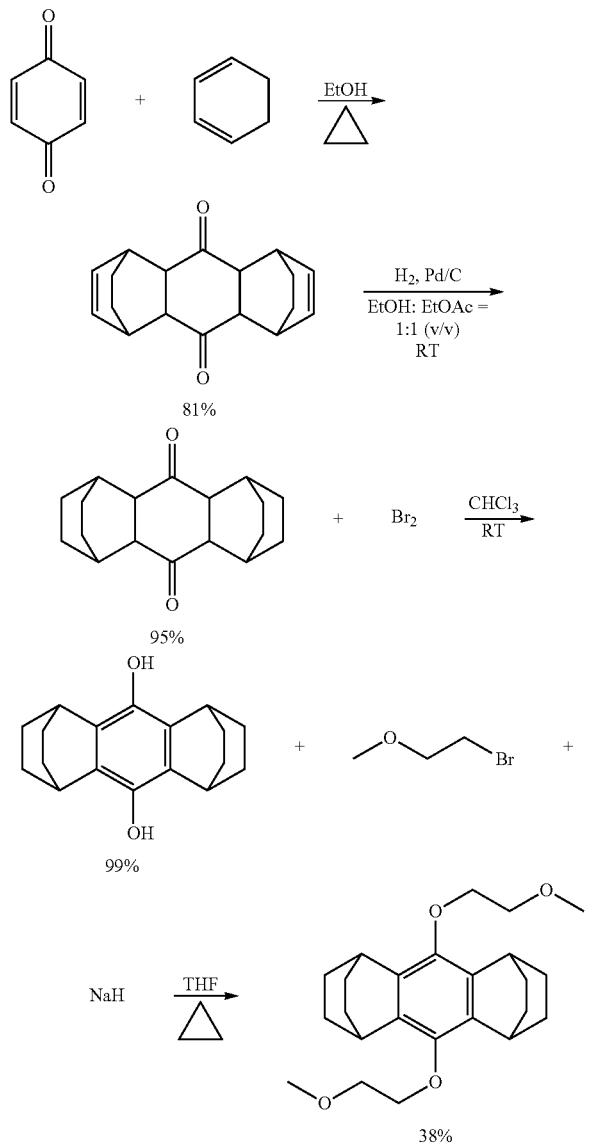

To a solution of p-quinone (10.0 g, 92 mmol) in 100 mL of ethanol was added 1,3-cyclohexyaldiene (14.8 g, 185 mmol) at room temperature. The reaction mixture was refluxed overnight. A white solid was collected by filtration and rinsed with cold ethanol (about 25 mL) to yield 1,4,4a,5,8,8a,9a,10a-octahydro-1,4:5,8-diethano-anthracene-9,10-dione (20.1 g, 81%).

Next, a solution of 1,4,4a,5,8,8a,9a,10a-octahydro-1,4:5,8-diethano-anthracene-9,10-dione (20.1 g, 75 mmol) in 200 mL of ETOH/EtOAc (1:1, v/v) containing 10 wt % Pd/C was hydrogenated under H$_2$ atmosphere at room temperature. The reaction progress was monitored by GC-MS. Upon the full consumption of the starting material, the Pd/C catalyst was separated by filtration through a short pad of Celite followed by rinsing with dichloromethane. The filtrate was concentrated in vacuo to afford dodecahydro-1,4:5,8-diethanoanthracene-9,10-dione (21.5 g, 95%).

Dodecahydro-1,4:5,8-diethanoanthracene-9,10-dione (3.6 g, 14.6 mmol) was dissolved in 20 mL of dry chloroform at room temperature and a solution of Br$_2$ (2.3 g, 14.6 mmol) in 20 mL of chloroform was added dropwise over about 0.5 hour. A white precipitate was observed upon addition of Br$_2$. The resulting suspension was stirred at room temperature for about 2 hours. Most of the HBr produced in the reaction was blown off by bubbling N$_2$ through the reaction mixture. The resultant suspension was cooled in an ice-acetone bath, and the precipitate was filtered in vacuo to provide 1,2,3,4,5,6,7,8-octahydro-1,4:5,8-diethanoanthracene-9,10-diol (3.5 g, 99%).

In the last step, 1,2,3,4,5,6,7,8-octahydro-1,4:5,8-diethanoanthracene-9,10-diol (1.5 g, 5.6 mmol) was dissolved in dry tetrahydrofuran (12 mL). NaH (0.7 g, 1.67 mmol) and 2-bromoethylmethyether (1.6 g, 1.17 mmol) were added to the reaction mixture. The reaction was stirred at room temperature overnight, and then was quenched by adding about 20 mL of 0.1 M NaHCO$_3$ aqueous solution. the mixture was extracted with dichloromethane, and the organic layer was then dried over Na$_2$SO$_4$. The crude product was recrystallized from hexane and dichloromethane to afford 9,10-bis(2-methoxyethoxy)-1,2,3,4,5,6,7,8-octahydro-1,4:5,8-diethanoanthracene (0.8 g, 38%).

$^1$HNMR spectrum of BODEA. $^1$HNMR (300 MHz, CDCl$_3$): δ/ppm 3.90-3.88 (m, 3H), 3.75-3.73 (m, 0.7H), 3.72-3.69 (m, 3.3H), 3.53-3.48 (m, 1H), 3.46 (s, 4.5H), 3.40 (s, 1.5H), 3.36 (s, 4H), 1.75-1.70 (m, 8H), 1.35-1.29 (m, 8H); $^{13}$CNMR spectrum of BODEA. $^{13}$CNMR (75 MHz, CDCl$_3$): δ/ppm 147.2, 144.7, 133.8, 74.0, 73.5, 71.9, 61.7, 59.1, 58.8, 26.9, 26.3, 25.9, 25.2.

FIG. 1 illustrates the structures of BODMA and BODEA as determined by NMR and, in the case of BODMA, also by x-ray crystallography.

Example 2. Electrochemical Evaluation of BODMA and BODEA in Lithium Ion Cells

All electrodes utilized herein are from the Argonne National Laboratory (ANL) Cell Analysis, Modeling and Prototyping (CAMP) facility.

Coin Cells:

The positive electrode material was composed of 80 wt % LiFePO$_4$ (LFP), 8 wt % polyvinylidene fluoride (PVDF) binder, and 12 wt % carbon black coated on an aluminum current collector. The loading density of the positive electrode active material was 12.1 mg/cm$^2$. The negative electrode was composed of 90 wt % mesophase microbead graphite (MCMB), 10 wt % poly(tetrafluroethylene) (PTFE) binder coated on a copper current collector. The loading density of the negative electrode active material was 6.2 mg/cm$^2$. The separator used in the coin cell assembly was a polypropylene/polyethylene/polypropylene separator (PP/PE/PP; CELGARD 2325). The baseline electrolyte used was composed of 1.2 M LiPF$_6$ in ethylene carbonate/ethyl methyl carbonate (EC/EMC) (3:7 w/w), containing the redox shuttle additive. All electrodes used were dried at 100° C. prior to use and all coin cells were assembled in an argon-atmosphere under constant-temperature (30° C.).

All electrochemical data were collected on MACCOR cyclers using 2032-type coin cells and the positive electrode, negative electrode and separator were 14, 15 and 16 mm in diameter, respectively.

Figure 2:
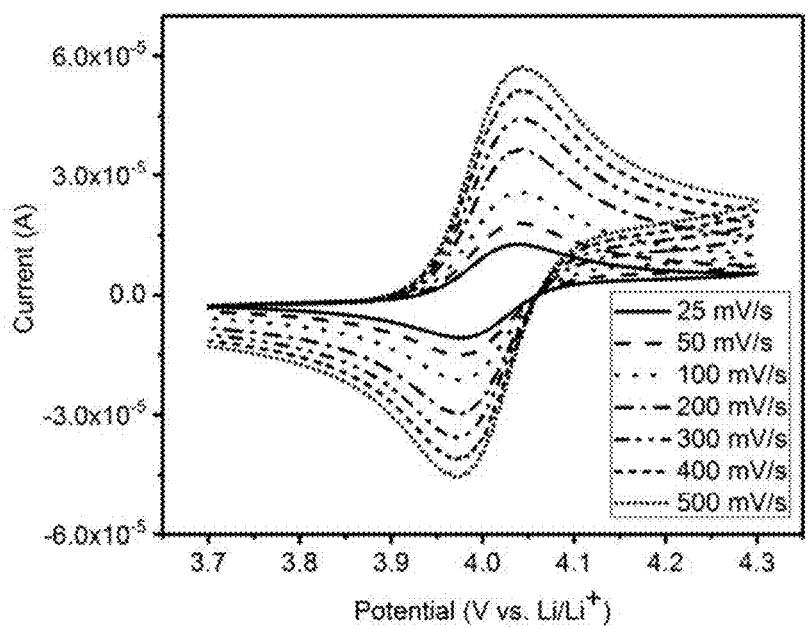
FIG. 2 shows cyclic voltammograms of electrochemical cells utilizing an electrolyte containing BODMA (10 mM) at various scan rates.

FIG. 2 shows cyclic voltammograms of BODMA (10 mM) in 1.2 M $LiPF_6$ in ethylene carbonate/ethyl methyl carbonate (3:7 by weight) using a three electrode system (Pt working electrode, Li counter electrode and Li reference electrode) at different scan rates.

One pair of electrochemically reversible peaks was observed between 3.9 and 4.1 V vs $Li/Li^+$, which is well below the stability threshold voltage (about 4.8 V vs. $Li/Li^+$) of common electrolyte components such as ethylene carbonate, propylene carbonate, dimethyl carbonate, and $LiPF_6$. The exceptional electrochemical reversibility of BODMA makes this compound useful as a redox shuttle additive for overcharge protection of lithium-ion batteries.

Figure 3:
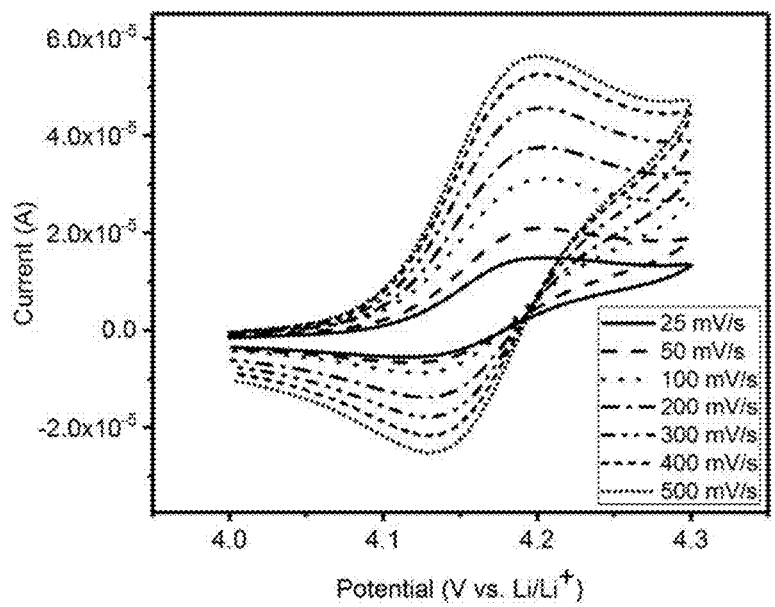
FIG. 3 shows cyclic voltammograms of electrochemical cells utilizing an electrolyte containing BODEA (10 mM) at various scan rates

FIG. 3 provides cyclic voltammograms of BODEA (10 mM) in 1.2 M $LiPF_6$ in ethylene carbonate/ethyl methyl carbonate (3:7 by weight) using a three electrode system (Pt working electrode, Li counter electrode and Li reference electrode) at different scan rates. One pair of electrochemically reversible peaks was observed between 4.1 and 4.2 V vs $Li/Li^+$, which is well below the stability threshold voltage (about 4.8 V vs. $Li/Li^+$) of common electrolyte components such as ethylene carbonate, propylene carbonate, dimethyl carbonate, and $LiPF_6$. The exceptional electrochemical reversibility of BODEA makes this compound useful as a redox shuttle additive for overcharge protection of lithium-ion batteries.

Figure 4:
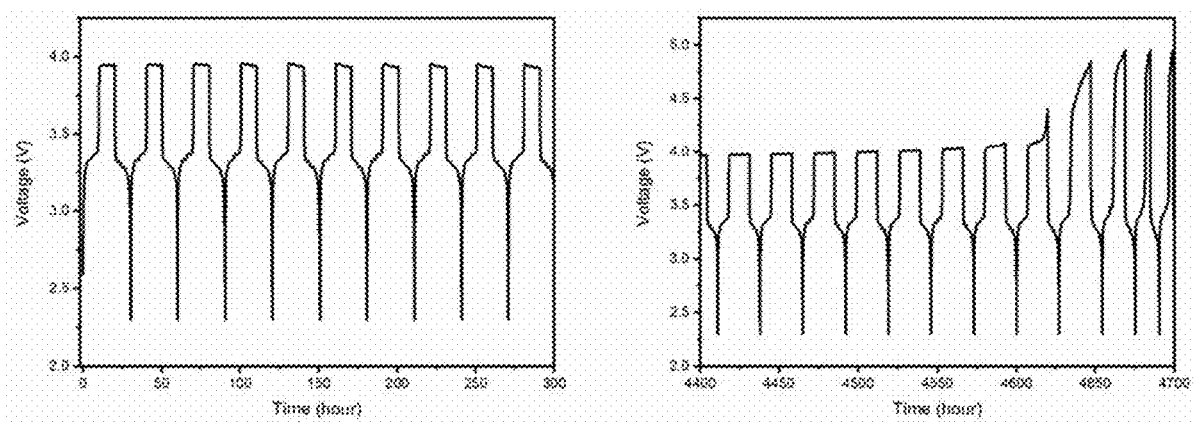
FIG. 4 shows a voltage profile of overcharge data from coin cells using an electrolyte containing BODMA (0.1 M); charging rate of C/10 and overcharge rate of 100%. The left plot shows data for the first 300 hours of cycling. The right plot shows data for hours 4400 to 4700 of cycling.

FIG. 4 shows voltage profiles of overcharge tests of coin cells using MCMB and LFP as the anode and cathode active materials, respectively, and an electrolyte comprising BODMA (0.1 M) in 3:7 (w/w) ethylene carbonate/ethyl methyl carbonate containing 1.2 M $LiPF_6$, during the course of 4700 hours. The charging rate was C/10 and the overcharge rate was 100%. The 9,10-bis(2-methoxyethoxy)-1,2,3,4,5,6,7,8-octahydro-1,4:5,8-dimethanoanthracene additive demonstrated excellent overcharge protection performance in 3:7 (w/w) ethylene carbonate/ethyl methyl carbonate electrolyte, making BODMA as effective as DBBB. The left plot in FIG. 4 shows data for the first 300 hours of cycling. The right plot in FIG. 4 shows data for hours 4400 to 4700 of cycling.

Figure 5:
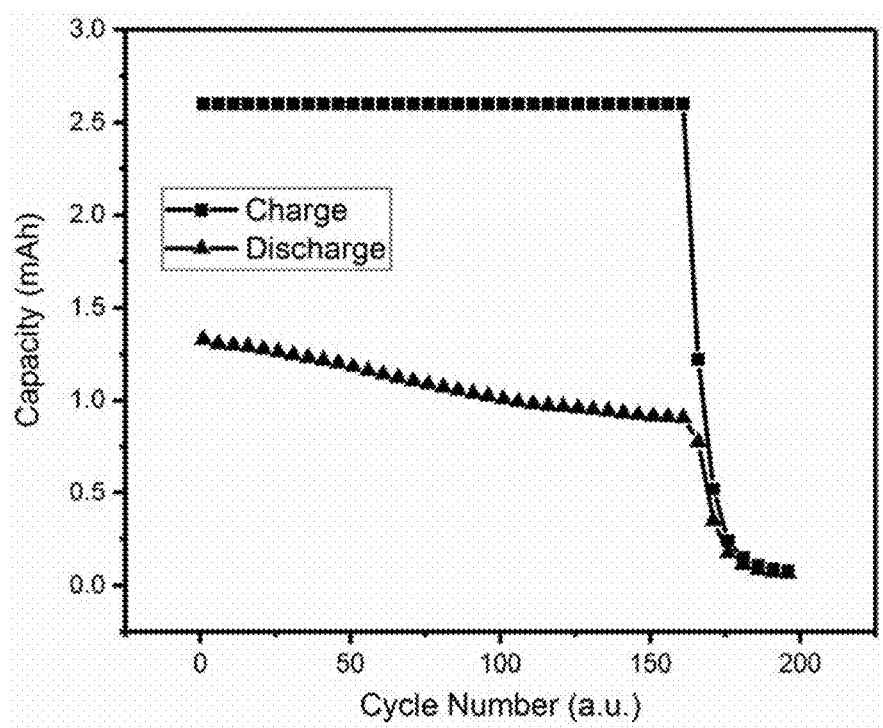
FIG. 5 shows a capacity profile from an overcharge test of coin cells using an electrolyte containing BODMA (0.1 M); charging rate of C/10 and overcharge rate of 100%.

FIG. 5. shows a capacity retention profile of overcharge test of coin cells using MCMB and LFP as electrodes and an electrolyte comprising BODMA (0.1 M) in 3:7 (w/w) ethylene carbonate/ethyl methyl carbonate containing 1.2 M $LiPF_6$, at a charging rate of C/10 and an overcharge rate of 100%. After 150 cycles, over 75% of the capacity of the cell was retained, making BODMA as effective as DBBB.

Example 4. Electrochemical Cells

Figure 6:
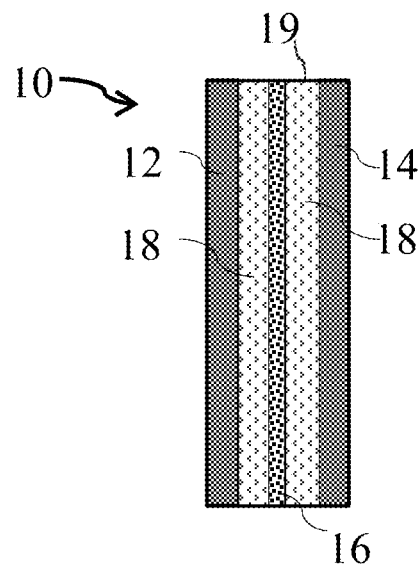
FIG. 6 schematically illustrates a lithium-ion electrochemical cell.
Figure 7:
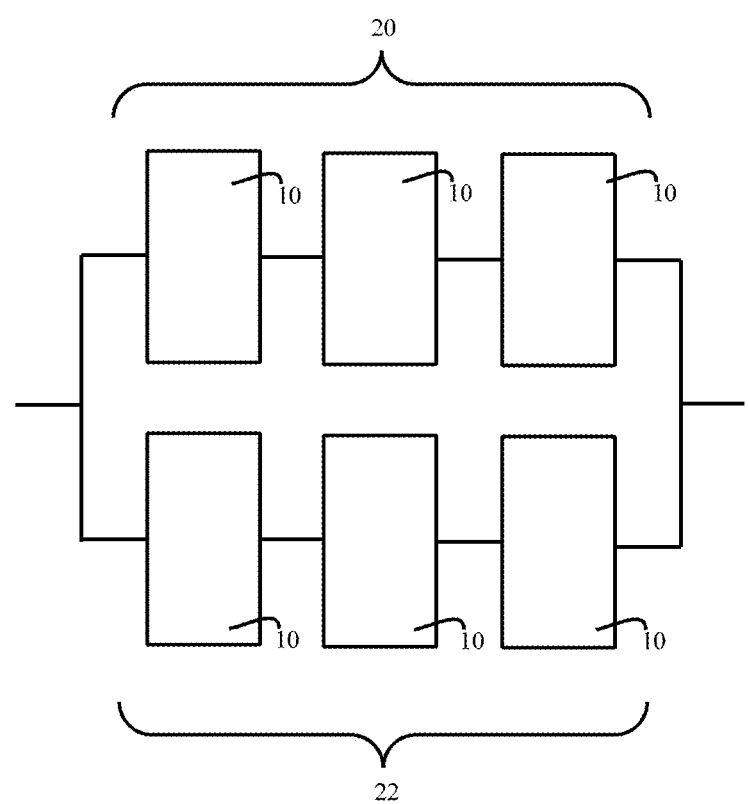
FIG. 7 schematically illustrates a lithium-ion battery.

FIG. 6 schematically illustrates a cross-sectional view of lithium-ion electrochemical cell 10 comprising cathode 12, and anode 14, with porous separator 16 therebetween. Electrolyte 18, comprising a solution of a lithium salt in a non-aqueous solvent containing a redox shuttle additive contacts electrodes 12 and 14 and separator 16. The electrodes, separator and electrolyte are sealed within housing 19. FIG. 7 schematically illustrates a lithium-ion battery comprising a first bank 20 consisting of three series-connected electrochemical cells 10, and a second bank 22 consisting of three series-connected electrochemical cells 10, in which first bank 20 is electrically connected to second bank 22 in parallel.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrolyte for a lithium-ion electrochemical cell comprising a non-aqueous solution of a lithium salt and a redox shuttle compound, wherein the redox shuttle compound comprises:
    (a) —OR groups at carbons 1 and 4 of a benzene ring;
    (b) a first hydrocarbon ring fused to carbons 2 and 3 of the benzene ring; and
    (c) a second hydrocarbon ring fused to the carbons 5 and 6 of the benzene ring; and
    wherein either (i) the first and second hydrocarbon rings together with the benzene ring constitute two fused benzobicyclo[2.2.2]octane ring systems; or (ii) the first and second hydrocarbon rings together with the benzene ring constitute two fused benzobicyclo[2.2.1]heptane ring systems sharing a common benzo core group; wherein the R of each —OR group independently is selected from $C_1$ to $C_4$ alkyl and $C_1$ to $C_4$ alkoxy-substituted $C_1$ to $C_4$ alkyl.

2. The electrolyte of claim 1, wherein the first and second hydrocarbon rings each comprise at least one substituent selected from the group consisting of alkyl, alkoxy, hydroxyl, halogen, substituted-alkyl, and substituted-alkoxy; wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

3. The electrolyte of claim 1, wherein the first and second hydrocarbon rings each are unsubstituted hydrocarbons.

4. The electrolyte of claim 1, wherein the lithium salt comprises at least one salt selected from the group consisting of $LiF_2BC_2O_4$, $LiPF_6$, $LiBF_4$, $LiB(C_2O_4)_2$, $LiClO_4$, lithium bis(fluorosulfonyl)imide (LiFSI), lithium bis(trifluoromethanesulfonyl)imide (LiTFSi), and $LiAsF_6$.

5. The electrolyte of claim 1, wherein the lithium salt and the redox shuttle are dissolved in at least one non-aqueous solvent selected from the group consisting of a linear dialkyl carbonate, a cyclic alkylene carbonate, a sulfolane, a sulfone, a fluoro-substituted linear dialkyl carbonate, a fluoro-substituted cyclic alkylene carbonate, a fluoro-substituted sulfolane, and a fluoro-substituted sulfone.

6. The electrolyte of claim 1, wherein the redox shuttle comprises a compound of Formula (I):

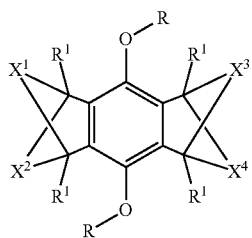

(I)

wherein:
each R independently is $C_1$ to $C_4$ alkoxy-substituted $C_1$ to $C_4$ alkyl;
$X^1$ is —$C(R^2)_2C(R^2)_2$—;
$X^2$ is —$C(R^2)_2C(R^2)_2$— or —$C(R^2)_2$—;
each of $X^3$ and $X^4$ is —$C(R^3)_2C(R^3)_2$— or —$C(R^3)_2$—; and
each $R^1$, $R^2$, and $R^3$ independently is selected from H, alkyl, substituted-alkyl, alkoxy, substituted-alkoxy, halogen, and hydroxyl; wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide;
with the provisos that:
(a) if $X^2$ is —$C(R^2)_2$—, then at least one of $X^3$ and $X^4$ is —$C(R^3)_2$—, and at least one of $X^3$ and $X^4$ is —$C(R^3)_2C(R^3)_2$—; and
(b) if $X^2$ is —$C(R^2)_2C(R^2)_2$—, then both of $X^3$ and $X^4$ are —$C(R^3)_2C(R^3)_2$—.

7. The electrolyte of claim 6, wherein each R is 2-methoxyethyl.

8. The electrolyte of claim 6, wherein each $R^1$, $R^2$, and $R^3$ independently is selected from H, $C_1$ to $C_4$ alkyl, and $C_1$ to $C_4$ alkoxy.

9. The electrolyte of claim 6, wherein each $R^1$, $R^2$, and $R^3$ is H.

10. The electrolyte of claim 1, wherein the first and second hydrocarbon rings together with the benzene ring constitute two benzobicyclo[2.2.2]octane ring systems, and the redox shuttle comprises a compound of Formula (II):

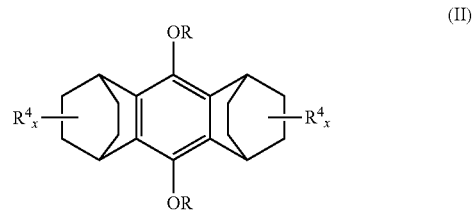

(II)

wherein:
the first hydrocarbon ring and the second hydrocarbon ring each optionally comprises one or more substituents $R^4$;
x is 0, 1, 2, 3, 4, 5, 6, 7, 8, 9, or 10;
each R independently is $C_1$ to $C_4$ alkoxy-substituted $C_1$ to $C_4$ alkyl; and
each $R^4$ independently is selected from alkyl, substituted-alkyl, alkoxy, substituted-alkoxy, halogen, and hydroxyl;
wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

11. The electrolyte of claim 10, wherein x is 0.

12. The electrolyte of claim 1, wherein the first and second hydrocarbon rings together with the benzene ring constitute two benzobicyclo[2.2.2]heptane ring systems, and the redox shuttle comprises a compound of Formula (III):

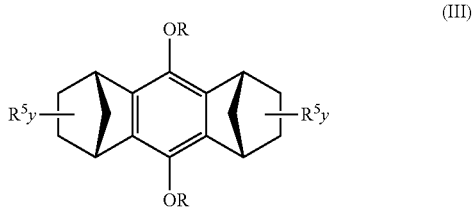

(III)

wherein:
the first hydrocarbon ring and the second hydrocarbon ring each optionally comprises one or more substituents $R^5$;
y is 0, 1, 2, 3, 4, 5, 6, 7, or 8;
each R independently is $C_1$ to $C_4$ alkoxy-substituted $C_1$ to $C_4$ alkyl; and
each $R^5$ independently is selected from alkyl, substituted-alkyl, alkoxy, substituted-alkoxy, halogen, and hydroxyl;
wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

13. The electrolyte of claim 12, wherein y is 0.

14. The electrolyte of claim 1, wherein the first and second hydrocarbon rings together with the benzene ring constitute two benzobicyclo[2.2.2]heptane ring systems, and the redox shuttle comprises a compound of Formula (IV):

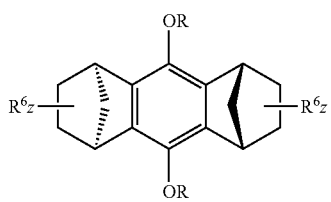

(IV)

wherein:

the first hydrocarbon ring and the second hydrocarbon ring each optionally comprises one or more substituents $R^5$;

z is 0, 1, 2, 3, 4, 5, 6, 7, or 8;

each R independently is $C_1$ to $C_4$ alkoxy-substituted $C_1$ to $C_4$ alkyl; and each $R^6$ independently is selected from alkyl, substituted-alkyl, alkoxy, substituted-alkoxy, halogen, and hydroxyl;

wherein each substituted-alkyl and substituted-alkoxy comprises an alkyl or alkoxy group, respectively, which is substituted by one of more substituent selected from the group consisting of halogen, hydroxy, alkoxy, cyano, aryl, carboxylic acid, carboxylic ester, and carboxylic amide.

15. The electrolyte of claim 1, wherein the redox shuttle is selected from a compound of Formula (V), a compound of Formula (VI) or a combination thereof:

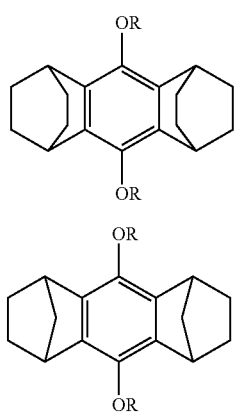

(V)

(VI)

wherein each R is $C_1$ to $C_4$ alkoxy-substituted $C_1$ to $C_4$ alkyl.

16. The electrolyte of claim 1, wherein the redox shuttle is selected from 9,10-bis(2-methoxyethoxy)-1,2,3,4,5,6,7,8-octahydro-1,4:5,8-dimethanoanthracene (BODMA), 9,10-bis(2-methoxyethoxy)-1,2,3,4,5,6,7,8-octahydro-1,4:5,8-diethanoanthracene (BODEA), and a combination thereof.

17. A lithium-ion electrochemical cell comprising an anode, a cathode, and an a porous membrane therebetween, wherein the electrolyte of claim 1 contacts the anode, the cathode, and the membrane.

18. A lithium-ion battery comprising two or more electrochemical cells of claim 17, wherein the cells are connected in series, parallel, or both series and parallel.

* * * * *